Jan. 16, 1968     C. B. BLAKE     3,363,557
HEAT TRANSFER OF INDICIA CONTAINING SUBLIMABLE COLORING AGENT
Filed Jan. 19, 1966
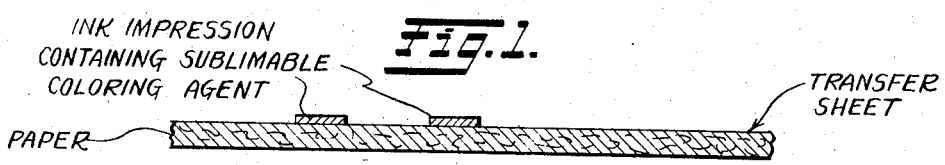
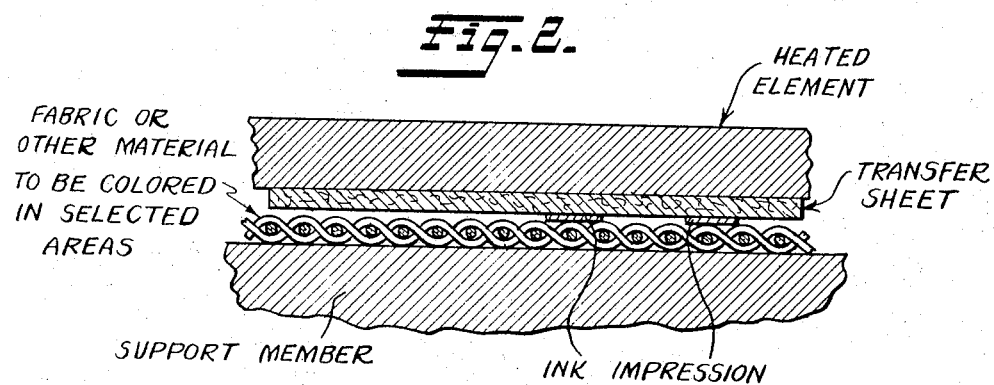
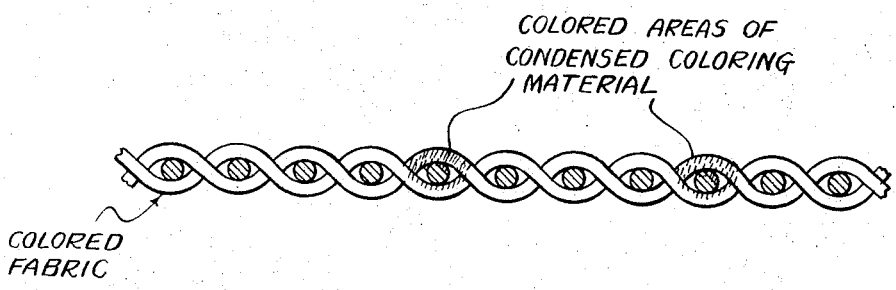
INVENTOR.
Carl B. Blake
BY
Schneider, Dressler, Goldsmith & Clement
ATTORNEYS

United States Patent Office 3,363,557
Patented Jan. 16, 1968

3,363,557
HEAT TRANSFER OF INDICIA CONTAINING
SUBLIMABLE COLORING AGENT
Carl B. Blake, Bronx, N.Y., assignor to Martin-Marietta
Corporation, New York, N.Y., a corporation of
Maryland
Continuation-in-part of application Ser. No. 115,152,
June 6, 1961. This application Jan. 19, 1966, Ser.
No. 532,490
9 Claims. (Cl. 101—470)

ABSTRACT OF THE DISCLOSURE

A process and structure for heat transfer of indicia from one surface to another involving the use of a transfer device consisting of a surface having imprinted thereon in mirror image the indicia to be transferred with an ink containing a sublimable dye.

---

The present application is a continuation-in-part of United States application Ser. No. 115,152, filed on June 6, 1961.

The present invention relates to processes for the heat transfer of ink impressions onto various surfaces and to the new inks and transfer sheets which enable these processes to be carried out. The transfer processes of the invention are of value in the production of patterns, especially garment patterns, decoration and duplication of copy, e.g., a typed, written or printed page.

Inks which can be employed in heat transfer processes are known, these largely relying upon the presence of a component which melts and becomes adhesive to transfer to the receiving surface. These known inks, which are illustrated by those which contain wax or some meltable dye in a non-siccative binder, are inadequate for numerous reasons. Thus, the transfer act is, essentially, the smearing of a molten, sticky material from one surface to an adjacent surface. The smearing produces a discontinuous or diffused image and the original ink impression is obliterated by loss of large portions thereof to produce the first image and by spreading of the ink as a result of heat and pressure. Very few transfers can be made in this way and the quality of the transfer produced decreases rapidly with use. Moreover, inks containing meltable components in any substantial proportion are not well adapted for application by offset printing. In all instances, and irrespective of printing processes, special equipment is required to use these inks. The provision of offset inks is a feature of the invention, such inks permitting the economic production of large numbers of ink impressions at high speed and at minimum cost. In this way, heat transfer garment patterns become economically feasible.

The present invention is directed toward the elimination of these prior inadequacies, as has been explained, and to the production of new inks, new heat transfer sheets and new heat transfer processes.

In accordance with the present invention, an ink is employed which comprises a coloring agent having the following sublimation characteristics:

(A) No noticeable sublimation below 120° F.;
(B) a sublimation half-life at 500° F. of less than 75 seconds; and
(C) a sublimation half-life at a temperature in the range of from 140° F. to 500° F. of from 0.5–75 seconds.

Preferably, the desired sublimation half-life of the coloring agent exists at a temperature in the range of from 180° F. to 450° F., and most preferably in the range of from 250° F. to 425° F.

The term "sublimation half-life" designates the time required for a 50% weight loss through elimination of part of the coloring agent as a result of its conversion to the gaseous state.

When coloring agents are selected, as indicated above, the application of heat at temperatures of from 140° F.–500° F., especially from 250° F.–450° F., with moderate pressure, effects sufficient slow gasification or sublimation of coloring agent to produce a distinct image by condensation of the gases generated on a receiving surface within a short period of time, desirably within 15 seconds, preferably from 1–5 seconds.

If the coloring agent does not sublime sufficiently at temperatures below 500° F., then transfer by the mechanism of the invention necessarily requires excessive temperatures applied for excessive times. This requirement for rapid, relatively low temperature partial sublimation excludes conventional printing inks. Similarly, coloring agents which sublime at temperatures below 120° F. are also undesirable because these will transfer at temperatures where transfer is not desired, as in a stack of sheets or upon inadvertent contact with materials at slightly elevated temperature. Moreover, when transferring at elevated temperatures, these agents which sublime too easily do not condense properly. Thus, coloring agents which sublime partially at intermediate temperature, as defined, provide new and valuable utility not hitherto suspected.

The ink preferably further comprises an organic binder. When a binder is used, it is essential that the binder does not confer any overall tackiness which leads to film transfer because this would override transfer by gasification and condensation. Accordingly, if the binder is of the type which remains wet in the ink impression which is produced, or if it is of the type which melts under the elevated temperature conditions employed in the heat transfer process, then it is essential that the relationship of vehicular viscosity, pigment loading and substrate porosity be selected to prevent any tackiness of the binder from influencing the overall non-tacky character of the ink impression. Thus, typewriter ribbons, carbon paper, stamp pad inks and ball point pen inks include non-drying oils or small amounts of wax, but these inks are formulated with large amounts of coloring matter such as carbon black, and these are applied to paper of high porosity so that any tackiness of the binder is not discernible in the final ink impression. Of course, these inks which include binders which remain wet or which are incapable of remaining solid under the elevated temperature conditions contemplated, tend to form ink impressions which smear when rubbed, a characteristic which is undesirable in printing inks.

The invention is particularly directed to printing inks and these, in accordance with the invention, comprise organic resinous binder which when deposited, either with or without the use of moderate heat, supply a dry solid film which remains solid and dry upon exposure to the elevated temperature transfer conditions which are employed in the invention.

A dry solid film identifies an extent of dryness sufficient to reasonably resist physical transfer of the film to a contacting surface under mild pressure.

So long as the binder forms a dry solid and heat resistant film, any organic resinous binder may be used. Thus, a printing ink containing 100% solids in which the binder consists of a drying oil such as linseed oil may be used. Similarly, a printing ink containing fumarated wood rosin in 50% by weight solution in either ethanol or diethylene glycol is also satisfactory.

Normally, the ink is formulated to include the binder and from 3–25% by weight of sublimable coloring agent. When multiple heat-transfer copies are required it is highly advantageous to include at least 10% by weight of sublimable coloring agent in the ink. Since some inks contain volatile components which are eliminated to produce the dry ink impression, the ink impression will normally include from 10–50% by weight of sublimable coloring agent. These proportions do not represent precise limits since, when less coloring agent is used, fewer transfers can be made and, when more coloring agent is used, more transfers can be made.

Usually, the ink impression does not exceed 10 microns in thickness. With such thin films, the coloring agent in gaseous form can penetrate the film regardless of the resin binder which is selected. On the other hand, molten coloring agent is trapped to a much greater extent within the heat resistant film of binder.

In the preferred printing inks, the liquid continuum of the ink is in an organic liquid such as a drying oil or an organic solvent having a resin dissolved therein. The coloring agent is desirably an oil-soluble organic dyestuff, having the sublimation characteristics defined, the dyestuff being dissolved in the organic liquid continuum of the ink. However, the sublimable coloring agent may be organic or inorganic and it may be dissolved or dispersed in the ink. Moreover, supplemental dyes and pigments may also be used. Indeed, the ink may deposit a black impression on the transfer sheet through the presence of carbon black pigmentation and the act of heat transfer may produce a yellow copy through the presence of a yellow sublimable dye.

The specific nature of the coloring agent is of secondary significance and inorganic as well as organic agents are both contemplated. Organic dyestuffs which are oil soluble are presently preferred, but it must be kept in mind that these must sublime as previously described. To illustrate suitable coloring agents, Sudan Yellow GRA described in the Colour Index as Solvent Yellow 30 is a preferred dye. This dye is a disazo dye identified by Colour Index No. 21240 and has the formula:

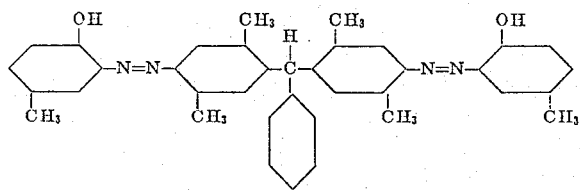

Certain anthraquinone dyes also possess the essential sublimation characteristics, as for example: Brilliant Oil Blue BMA and Plasto Blue RDA described in the Colour Index as Solvent Blue 16. These dyes produce different shades of blue when transferred. Particularly when the dyes have similar subliming characteristics, they may be used in combination to produce various colors.

These dyes which are useful in the invention are distinguished from meltable dyes such as Victoria Blue which melts but does not sublime, and Victoria Green and Rhodamine (blue shade) which sublime so rapidly at low temperature as not to be useful in the invention.

In the invention, the dye may melt, but if it does, its presence within a dry heat-resistant binder substantially prevents film transfer as a result of melting and transfer is confined by the invention to sublimation and condensation.

The invention is of particular importance in offset printing in which the coloring agents employed in the offset ink must be selected to have a high resistance to water in order to prevent bleeding of the coloring agent into the hydrophilic portions of the offset printing plate. In other words, the coloring agent must be substantially insensitive to water. Similarly, and as is well known, the organic liquid continuum of offset inks is immiscible with water.

The heat transfer process of the invention employs a transfer lamina, e.g., a sheet, strip, patch, ribbon or the like having an ink impression of an ink of the type described and the surface intended to receive a copy of the impression is brought into approximate surface contact with the original ink impression. Heat, and preferably also pressure, are then applied to cause the coloring agent to progressively sublime at an intermediate elevation temperature. The vapors generated under these mild conditions of sublimation (including volatilization) have a strong tendency to condense when they contact a somewhat cooler surface, e.g., the contacting surface. Thus, partial sublimation and condensation of coloring agent produce a mirror copy of the original. This copy is unique because it is a true reproduction of the original in its entirety. Lines are reproduced with continuity, as in the original. Half-tone dots are accurately reproduced. The image is sharp and clear. At the same time, the original ink impression is not damaged and many clear copies can be made before the coloring agent becomes exhausted, e.g., when transferring to thin, closely woven white cotton cloth, at least 12 clear and vivid copies are easily made and, in many instances, greater numbers of acceptable copies can be made.

By approximate surface contact is meant that the receiving surface is closely adjacent to the ink impression. While direct contact is preferred, a slight spacing as by the presence of an intermediate, thin porous layer can be tolerated.

The coloring agent may be substantive with the receiving surface or not, as desired, depending upon whether a permanent or a washable copy is desired.

The heat transfer sheet itself may be constituted by a layer of any printable material. Obviously, however, thin paper is preferred from the standpoint of economy. While the heat transfer ink impression may be deposited on the transfer sheet in any manner, as by letterpress, gravure, typing, stamping, hand drawing, etc., offset application, as has been explained, is particularly preferred. In any event, the heat transfer ink is applied to the transfer sheet, any volatile component of the ink is evaporated, and an impression of binder containing sublimable coloring agent is produced on a surface of the transfer sheet. Preferably, the binder should not melt under the conditions of transfer, especially if the coloring agent has any tendency to melt under transfer conditions. For purposes of the invention, the impression is desirably a dry impression.

An understanding of the invention may be facilitated by reference to the accompanying drawing in which:

FIG. 1 is a cross-section of a printed transfer sheet in accordance with the invention;

FIG. 2 is a cross-section of an assembly of superposed sheets in position for heat transfer by sublimation and condensation in accordance with the invention; and FIG. 3 is a cross-section of the product which is produced when the heat transfer procedure is completed.

Referring more particularly to the drawings, these are diagrammatic and legends are used to make the drawings self-explanatory. FIG. 1 shows a typical transfer sheet, these having been described in detail heretofore. As can be seen in FIG. 2, the transfer sheet is inverted over a fabric or other material to be colored upon any suitable support member and a heated element, such as an iron, is placed atop the superposed sheets to provide the brief period of heat and mild pressure which is needed. The sublimable coloring material in the ink impression is gasified by the heat and condenses immediately on the fabric which is at a slightly lower temperature to form the desired copy which is illustrated in FIG. 3. The coloring material enters the fabric as a gas and is condensed within it as well as on the surface. Indeed, in some instances, both sides of the fabric may show a discernible copy of the original. The original ink impression is not destroyed and may be used many times.

Various materials have been successfully used in the invention to receive the gaseous coloring material. Fabrics of all variety can be colored in selected areas. Wood, cotton, linen, paper and other cellulosic materials are particularly preferred. However, wool, nylon and other fibers may be used. Similarly, sheets may be selectively colored such as various plastics including nylon, cellulose acetate, polyesters including ethylene glycol terephthalate homopolyester, polyethylene, polyvinyl chloride, polyvinyl fluoride, enameled surfaces and even metallic surfaces, especially anodized aluminum. The purpose of selective coloring may also vary, marking for pattern purposes, decoration and copying of printed matter being particularly contemplated. Several colors can be transferred simultaneously, unlike usual printing where one color is printed at a time. The simultaneous transfer of many colors is particularly useful in the field of labeling.

In the field of reproducing copy, it should be appreciated that the original copy applies a mirror image of the original to the undersurface of a transparent or translucent receiving sheet so that the copy can be properly viewed through the body of the sheet.

The invention is illustrated in the following example.

*Example*

An example of a yellow offset printing ink which can be heat transferred by the invention is as follows:

| | Parts by wt. |
|---|---|
| Long oil linseed-isophthalic alkyl [1] | 12.50 |
| Medium viscosity linseed oil | 25.00 |
| Heavy viscosity linseed oil | 12.50 |
| Calcium carbonate extender pigment | 30.00 |
| Sudan Yellow GRA Conc. (Colour Index No. 21240) | 20.00 |

[1] An alkyd of equimolar proportions of glycerin and isophthalic acid containing 65% by weight of linseed oil.

These components are stirred together and then milled on a 3-roll mill until the mixture has a grind gauge of about 3. The ink so-produced has all the properties of a good conventional offset ink with respect to body, dispersion, color, printability, etc. In addition, the dye component specified possesses the partial sublimation characteristics.

The ink so-produced will give very satisfactory offset prints when printed on thin paper on an offset press. The print will be dry to the touch in a few minutes and thoroughly dry in about 4–8 hours. The dry print, when placed over clean white linen, on an ironing board, and pressed slightly with a heated hand iron set at linen pressing temperatures (about 450° F.) for 2–3 seconds, will produce a true, clear and clean yellow image on the linen. This procedure can be repeated several times to produce further clear images. The original print on the paper remains dry to the touch and does not transfer as a film. Only color transfer to the linen takes place.

The invention is defined in the claims which follow.

I claim:

1. Process for the heat transfer of ink impressions comprising placing an object carrying a receiving surface in approximate contact with an ink impression printed upon a paper sheet, said ink impression comprising a coloring agent distributed in a dry solid organic resinous binder which resists softening to form a transferable film upon exposure to the elevated temperature conditions specified hereinafter, said coloring agent having the following sublimation characteristics:

(A) no noticeable sublimation below 120° F.;
(B) a sublimation half-life at 500° F. of less than 75 seconds; and
(C) a sublimation half-life at a temperature in the range of from 140° F. to 500° F. of from 0.5–75 seconds; and subjecting said printed paper sheet to a temperature in the range of from 140° F. to 500° F. for a period of time of up to 15 seconds to thereby cause said coloring agent to progressively sublime and condense upon said receiving surface.

2. Process as recited in claim 1 in which said receiving surface is cellulosic.

3. Process as recited in claim 1 in which said receiving surface is pressed into direct contact with said ink impression.

4. Process as recited in claim 1 in which the procedure is repeated a plurality of times with the same printed paper sheet to produce a plurality of copies.

5. Process for the heat transfer of color comprising placing an object carrying a receiving surface in approximate contact with an ink deposit carried by a printed surface of a transfer device, said ink deposit being a film of composition and form which is capable of resisting physical transfer to a contacting surface of the object to which the color is to be transferred in approximate contact therewith at about 140° F. to about 500° F. and containing a coloring agent having the following sublimation characteristics:

(A) no noticeable sublimation below 120° F.;
(B) a sublimation half-life at 500° F. of less than 75 seconds; and
(C) a sublimation half-life at a temperature in the range of from 140° F. to 500° F. of from 0.5–75 seconds; and subjecting said printed surface and its ink deposit to a temperature in excess of 140° F. for a period of time sufficient to cause said coloring agent to sublime and transfer to said receiving surface.

6. Process as recited in claim 5 in which heat transfer is effected by application of heat in the range of from 140° F.–500° F. for a period of from 1–5 seconds.

7. A transfer device for use more than once in the heat transfer of indicia from said device to a receiving surface of the object to which the indicia are to be transferred through the application of heat within the range of about 200° F. to about 450° F. to said device while in approximate contact with said receiving surface for about 2 to about 30 seconds, said transfer being characterized by sharpness, clarity and freedom from smudging, comprising a surface of a transfer sheet resistant to heat up to about 450° F. for at least about 10 seconds having deposited therein and thereon a layer of printing ink up to about 10 microns thick formed in mirror image of the indicia to be transferred, said layer comprising a film of composition and form which is capable of resisting physical transfer to a surface of the object to which the indicia are to be transferred in approximate contact with said ink-containing surface at about 140° F. to about 500° F. and containing at least 10% by weight of a coloring agent having no noticeable sublimation below 120° F., a sublimation half-life at 500° F. of less than 75 seconds and a sublimation half-life at a temperature in the range of 140° F. to 500° F. of from 0.5 to 75 seconds.

8. A device as in claim 7 wherein the surface resistant to heat up to about 450° F. for at least about 10 seconds is a paper surface.

9. A device as in claim 8 wherein the paper surface has deposited thereon a dried residue of printing ink comprising an alkyd-linseed oil varnish and about 20% by weight of the sublimable coloring agent.

References Cited

UNITED STATES PATENTS 2,770,534  11/1956  Marx _____ 101—495
3,280,735  10/1966  Clark et al. _____ 101—495

FOREIGN PATENTS 246,832  9/1963  Australia.

FOREIGN PATENTS

Apps, E. A.: Printing Ink Technology, Leonard Hill (Books) Ltd., London, 1958. T. P. A6, only p. 348.

DAVID KLEIN, *Primary Examiner.*